Nov. 15, 1932.  F. EVANS  1,888,115
AUTOMATIC WEATHER STRIP
Filed Jan. 12, 1931  2 Sheets-Sheet 1
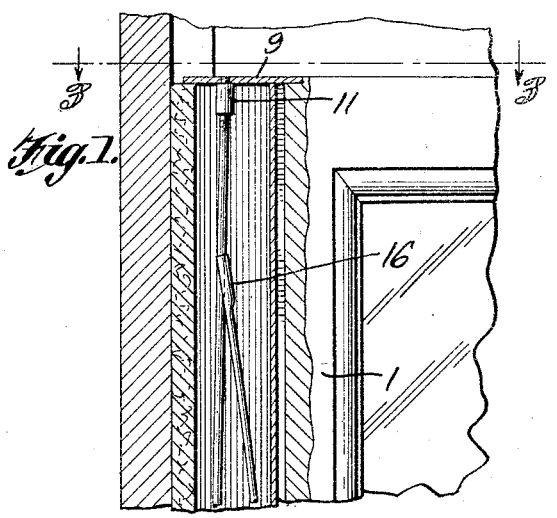
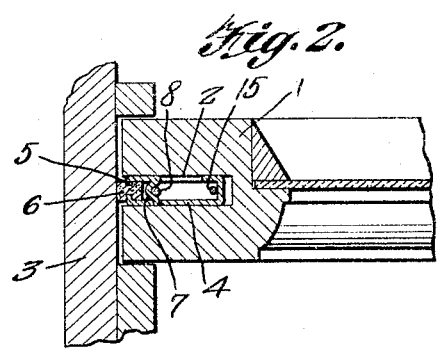
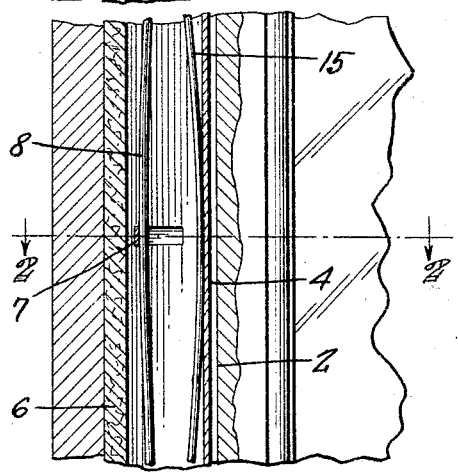
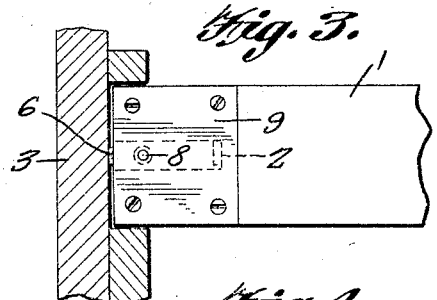
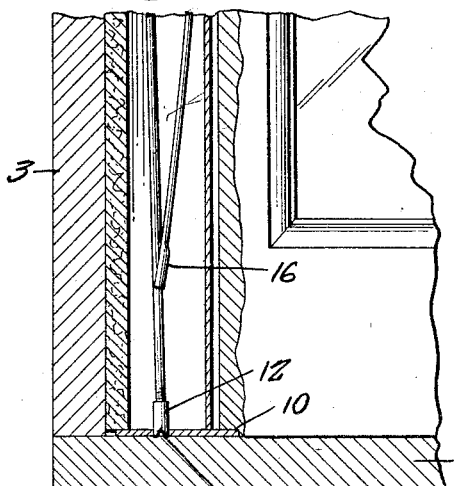
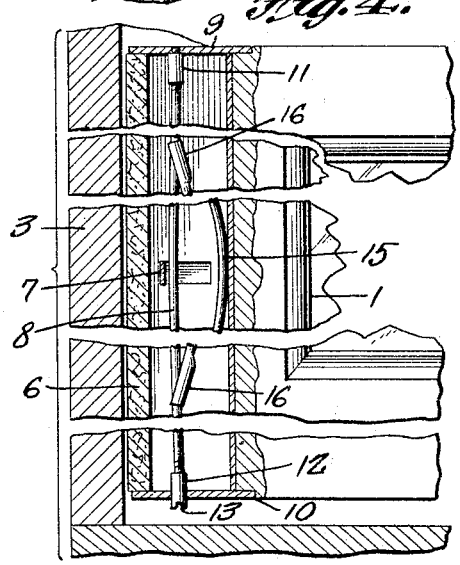
Frank Evans, INVENTOR Nov. 15, 1932.  F. EVANS  1,888,115
AUTOMATIC WEATHER STRIP
Filed Jan. 12, 1931  2 Sheets-Sheet 2
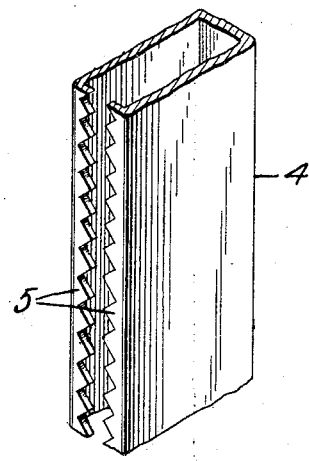
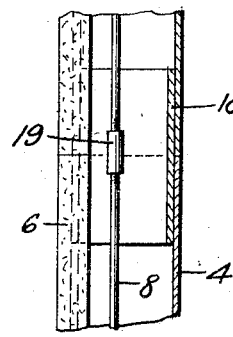
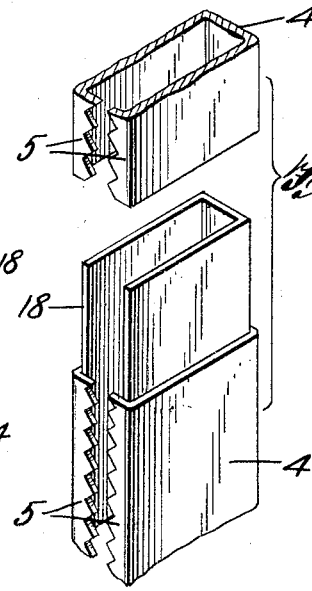
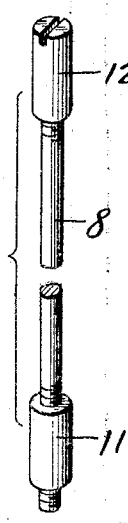
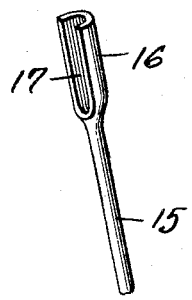
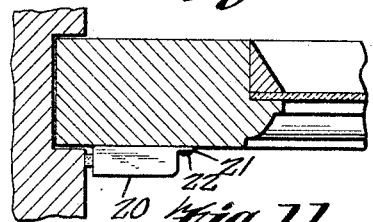
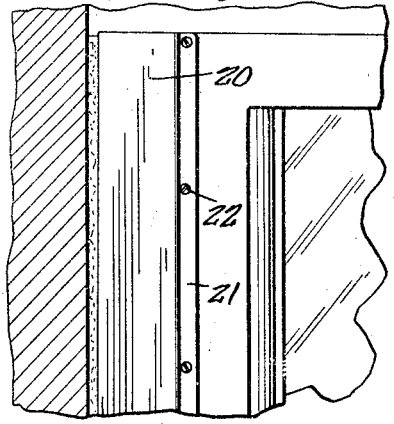
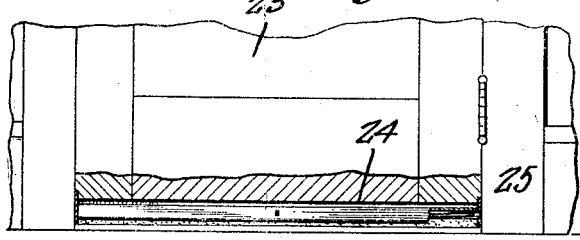
Frank Evans, INVENTOR Patented Nov. 15, 1932

1,888,115

UNITED STATES PATENT OFFICE

FRANK EVANS, OF CALIFORNIA, PENNSYLVANIA

AUTOMATIC WEATHER STRIP

Application filed January 12, 1931. Serial No. 508,298.

My present invention has reference to a weather strip for windows or doors, and my object is the provision of a weather strip which is automatically brought into frictional engagement with the sides of the window frame or with the threshold strip for a door when the window or door are brought to closed positions and which will move from such frictional engagement to permit of the free sliding of the sash or the free opening of the door.

A further object is the provision of a weather strip that may be readily adjusted to fit any window or door, and in which the spring means that influences the strip to frictional engagement with the window or door frame can be tensionally adjusted without removing any of the parts constituting the strip.

A further object is the provision of a weather strip that includes a casing having its outer edge inturned and preferably provided with teeth for gripping engagement with a compressible strip, a rod of spring metal arranged in the casing and centrally contacting with an element provided in said casing and having on one of its ends an adjustable element that projects through one end of the casing, the said rod being caused to bow when the adjustable element thereon is brought to contact with the frame of a window or door casing as when the window or door are closed and by virtue thereof to impart a movement to the casing to bring the strip carried thereby into tight frictional engagement with the window or door frame, so that air, dust, etc., is positively excluded from the room provided with the door or window when the said door or window is closed.

A further object is the provision of a means arranged in the casing and contacting with the rod for assisting in holding the rod when in bowed condition.

To the attainment of the foregoing and other objects which will present themselves as the nature of the invention is better understood, the improvement resides in the construction, combination and operative association of parts, one satisfactory embodiment of which is disclosed by the accompanying drawings.

In the drawings:

Figure 1 is a side elevation with parts in section of a window and a frame or casing therefor, illustrating the application of the improvement.

Figure 2 is a sectional view approximately on the line 2—2 of Figure 1.

Figure 3 is a sectional view approximately on the line 3—3 of Figure 1.

Figure 4 is a view substantially similar to Figure 1 but showing the position of parts when the sash is raised.

Figure 5 is a fragmentary perspective view of the casing.

Figure 6 is a similar view of the spring rod.

Figure 7 is a fragmentary perspective view of the normally arched spring employed.

Figure 8 is a detail sectional view to illustrate the manner in which the casing and rod may be constructed of sections.

Figure 9 is a perspective view of the sectional casing disclosed by Figure 8.

Figure 10 is a transverse sectional view through a window sash showing the improvement arranged on one side thereof.

Figure 11 is a side elevation of the device as disclosed by Figure 10.

Figure 12 is an elevation with parts in section showing the arrangement of the improvement on a door.

In Figures 1 to 4 of the drawings I have illustrated my improvement applied to the vertical stile of a window sash 1, in which the said stile has a central and longitudinal groove or opening 2 therein. The sash 1 slides between the beads of a window frame or casing 3, in the usual manner.

For the sake of convenience I will hereinafter refer to the groove or opening 2 in the window as a pocket, and in this pocket I arrange a substantially U-shaped metal casing 4. The outer and open end of the casing is formed with inwardly directed flanges 5, and these flanges have their edges toothed and the said teeth are in biting engagement with a compressible strip 6 of a length equaling that of the casing 4 and the said casing 4 is of a length equaling the height or length of the stile of the sash 1. The casing 4, however, is of a less width than the depth of the pocket 2, and one of the sides of the casing, at the center thereof, is slotted both transversely and longitudinally and the metal bounded by this slot is bent inwardly and has its end passed through a notch in the second side of the casing. The central portion of this bent part of the casing is rounded, as at 7, and the transverse member thus provided in the casing is in the nature of a stop or contact element for the central portion of a spring rod 8.

Both the open top and bottom of the casing 4 are closed by plates 9 and 10 secured, respectively, to the top and bottom of the sash 1 and these plates, of course, close the pocket 2. The upper end of the spring rod 8 has screwed thereon a sleeve 11 which contacts with the upper plate 9, and the upper end of the rod 8 preferably is screwed through an opening in the said plate 9 and is held from outward movement through the said plate 9 by the sleeve 11. The second or lower end of the rod 8 is also threaded and has screwed thereon a sleeve 12 that passes through an opening that is in a line with the opening in the plate 9. The outer end of the sleeve 12 is kerfed, as at 13, whereby the sleeve may be adjusted on the rod 8.

The rod 8 is normally straight and exerts no pressure against the casing 4 and the strip 6 are slightly projected through the pocket 2 but not sufficient to be brought into frictional contact with the frame or casing 3, so that the sash 1 may be freely raised or lowered. When the sash is fully lowered the outer end of the sleeve 12, which is projected through the opening in the plate 10, is brought into contact with the horizontal member or sill 14 of the frame 3, and the pressure thus exerted on the sleeve will arch the rod 8 to cause the center of said rod to engage with the contact 7 to project the casing 4 through the pocket 2 and to bring the strip 6 into frictional contact with the side of the casing 3 and thereby establish an air and dust proof joint between the sash and frame. Having its central portion fixedly secured in the back of the casing 4, at a point directly opposite the stop 7, there is an arched rod 15 which is of a less length than that of the spring rod 8. The arched spring 15 has its ends widened, as at 16, and the outer faces of the said widened portions are concaved longitudinally, as at 17, and these concaved ends receive therein the spring rod 8 at points approximately equidistant from the ends of the said rod. The arched spring member 15 having its ends contacting with the rod 8 will have a tendency of forcing the normally straight rod, when the latter is arched or bowed as just described, in the direction of the stop 7 and when the sleeve 12 on the rod is moved with the sash off of the sill 14 and the rod is returned to its initial straight position the concaved ends of the arched spring 15 will ride in opposite directions on the now straight rod 8 so that the arched spring 15 will return the casing 4 into the pocket 2 and thus permit the free sliding of the sash. On the upper sash the parts are reversely arranged, that is, the sleeve 12 projects through the top plate on the said upper sash so that the same will contact with the top of the frame 3 when the upper sash is moved to closed position.

As disclosed by Figures 8 and 9 the casing 4 may comprise sections and may, therefore, be lengthened or shortened to accommodate itself to different size windows and doors. Between the confronting ends of the sashes there is arranged a substantially U-shaped member 18 which frictionally engages with the said casing sections and holds the same associated. The spring rod 8 may be likewise constructed of sections, the confronting ends of which having oppositely hand pitched threads for similar threads in a coupling member or sleeve 19.

In Figures 10 and 11 a means is disclosed whereby the device may be arranged upon the outer face of the vertical stiles of the window or a door, all the construction being similar to that previously described, except that the casing 4 is enclosed in a metal housing 20 that has its edges at its open inner face flanged, as at 21, and the said flanges are provided with openings for the reception of securing elements, such as screws 22.

Figure 12 illustrates a manner whereby the device may be arranged in the bottom of a door. The door 23 has its lower edge grooved longitudinally to provide the same with a pocket 24 in which the casing 4 is received and in this instance the adjustable sleeve 13 on the end of the rod contacts with the inner face of the frame 25 for the door at the side of the frame to which the door 23 is hinged.

The simplicity of the construction and the advantages thereof, will, it is thought, be fully understood and appreciated by those skilled in the art to which this invention relates when the foregoing description has been read in connection with the accompanying drawings. It will be noted that the weather strip is automatic in action, will be retarded and drawn inwardly when the door or window is opened and will be projected to frictionally contact with the side members of the frame of the window casing or with the threshold strip 25 for the door or, if desired, with this strip and with one or both of the vertical members of the door frame. It is believed that further detailed description will not be required.

If desired, the strip may be covered with cloth or any other suitable material.

Having described my invention, I claim:

1. In a device for the purpose set forth, a movable member and a stationary member for the movable member, a casing carried by the movable member having a compressible strip on the outer face thereof, a normally straight spring rod having one of its ends secured in one of the ends of the casing and its other end extending through the second end of the casing, a stop in the casing to be engaged by the rod when pressure is exerted upon the extending end thereof to bow the rod and an arched spring centrally fixed in the casing having its ends contacted with the spring rod for slidable movement on said rod, for the purpose set forth.

2. A movable member and a stationary member for said movable member, a casing carried by the movable member, and said movable member having plates closing the open ends of the casing, a compressible strip on the outer face of the casing, a normally straight spring rod having one end secured to one of the plates and its other end movable through the second plate, a transversely arranged contact element in the casing disposed away from the rod when the said rod is in its normal straight condition and designed to be engaged by the rod when the projecting end of the said rod is subjected to pressure in the direction of the casing to bow the rod and to move the casing outwardly with respect to the movable member, and an arched spring having its central portion contacting with the inner wall of the casing and its ends in contact with the rod, for the purpose set forth.

3. A movable member and a stationary member for said movable member, a casing carried by the movable member, and said movable member having plates closing the open ends of the casing, a compressible strip on the outer face of the casing, a normally straight spring rod having one end secured to one of the plates and its other end movable through the second plate, a contact element having an inner arched face arranged between the sides of the casing and positioned away from the rod when the rod is in straight condition, and said rod designed to be arched when pressure is exerted upon the projecting end thereof to contact with the stop and to force the casing outwardly with respect to the movable member, and an arched spring of a length slightly less than that of the rod, said arched spring having its central portion connected to the inner wall of the casing, its ends widened and the outer faces thereof grooved to receive the spring rod therein, for the purpose set forth.

4. A movable member and a stationary member for said movable member, a casing carried by the movable member, and said movable member having plates closing the open ends of the casing, a compressible strip on the outer face of the casing, a normally straight spring rod having one end secured to one of the plates and its other end movable through the second plate, an adjustable sleeve on the projecting end of the rod, a contact element arranged transversely in the casing, and designed to be engaged by the rod when pressure is exerted upon the sleeve and the end of said rod to bow the rod to cause the casing to be bodily moved outwardly with respect to the movable member, and an arched spring having its central portion secured to the inner wall of the casing, said arched spring being of a length slightly less than that of the rod and having its ends widened and the outer faces thereof grooved to receive the spring rod therein, for the purpose set forth.

In testimony whereof I affix my signature.

FRANK EVANS.